United States Patent
Leventer et al.

(10) Patent No.: US 8,108,896 B2
(45) Date of Patent: Jan. 31, 2012

(54) METHOD AND SYSTEM FOR PROVIDING INTERACTIVE SERVICES USING VIDEO ON DEMAND INFRASTRUCTURE

(75) Inventors: Amir Leventer, Kfar Saba (IL); Ran Oz, Modiin (IL)

(73) Assignee: ARRIS Group, Inc., Suwanee, GA (US)

( * ) Notice: Subject to any disclaimer, the term of this patent is extended or adjusted under 35 U.S.C. 154(b) by 1739 days.

(21) Appl. No.: 11/106,388

(22) Filed: Apr. 13, 2005

(65) Prior Publication Data
US 2005/0246737 A1    Nov. 3, 2005

Related U.S. Application Data

(60) Provisional application No. 60/563,018, filed on Apr. 15, 2004, provisional application No. 60/658,041, filed on Mar. 1, 2005.

(51) Int. Cl.
*G06F 13/00* (2006.01)
*G06F 3/00* (2006.01)
*H04N 5/445* (2006.01)
*H04N 7/18* (2006.01)

(52) U.S. Cl. ............................ 725/41; 725/61; 725/91
(58) Field of Classification Search ............. 725/86–90, 725/41, 60, 61
See application file for complete search history.

(56) References Cited

U.S. PATENT DOCUMENTS

| | | | | |
|---|---|---|---|---|
| 5,132,992 | A * | 7/1992 | Yurt et al. | 375/240 |
| 5,966,162 | A * | 10/1999 | Goode et al. | 725/90 |
| 6,057,832 | A * | 5/2000 | Lev et al. | 715/720 |
| 2006/0184982 | A1* | 8/2006 | Paz et al. | 725/88 |

* cited by examiner

*Primary Examiner* — Hunter Lonsberry
(74) *Attorney, Agent, or Firm* — Troy A. Van Aacken; Robert J. Starr

(57) ABSTRACT

A method for providing service to an end user, the method includes: converting images to multiple end user device readable pictures; receiving a request from an end user to display at least one image, wherein the request is conveyed over a TVOD infrastructure; and providing the end user with a stream of end user device readable pictures that includes at least one end user device readable picture that corresponds to the requested image.

46 Claims, 6 Drawing Sheets

METHOD AND SYSTEM FOR PROVIDING INTERACTIVE SERVICES USING VIDEO ON DEMAND INFRASTRUCTURE

RELATED CASES

This patent claims priority from: U.S. provisional patent application Ser. No. 60/563,018, filed Apr. 15, 2004, and U.S. provisional patent application Ser. No. 60/658,041 Filed Mar. 1, 2005.

FIELD OF THE INVENTION

The present invention relates to communication systems and especially to methods and systems for providing interactive services to end-users.

BACKGROUND OF THE INVENTION

Media streams are transmitted and stored over various networks and devices. In order to provide high resolution color images in an efficient manner the image must be dramatically compressed. Various methods for compressing and decoding media streams have emerged. A group of compression standards was developed by the Moving Picture Expert Group. These standards are known in the art as the MPEG family. Each MPEG standard defines a method for compressing and transmitting audio-visual information according to predefined timing schemes that allow displaying audio visual content embedded within media streams.

Raw video streams are provided to an MPEG encoder. An array of 8×8 pixels are Discrete Cosine Transformed to provide a block of 8×8 DCT coefficient blocks. The DCT coefficient blocks are assembled to macroblocks. The macroblocks are assembled to slices, that represent a horizontal strip of a picture. The strips are combined to make a picture. Each picture has a header.

A picture header includes picture type information, indicating whether the picture is I-picture, P-picture or B-picture. Pictures can be arranged as Group of Pictures (GOPs). A sequence of GOPS forms a video elementary stream. Video and audio elementary streams may be multiplexed to provide a transport stream or a program stream.

In Transport streams, the elementary streams are packetized to PES packets. Each PES packet includes a header that includes a stream ID. The PES header also includes timing information such as PTS and DTS that define when the pictures are to be available to a viewer and when pictures are to be provided to a decoder, prior to said presentation.

I-pictures are independent in the sense that they include the entire information that is required for displaying a picture. A P-picture is decoded in response to information embedded within a previous picture (backward prediction), while a B-pictures is decoded in response to information embedded within both a preceding (backward prediction) and succeeding picture (forward prediction).

The encoding process of each dependent picture (P-picture, and B-picture) includes searching, for each macroblock in the dependent picture, a best matching set of pixels in the reference picture. The spatial relationship between the macroblock and set of pixels (referred to a motion vector) as well as the difference information (also referred to as prediction error or as error information) between the macroblock and set of pixels are included within the dependent picture. It is noted that the prediction error is also processed by performing various stages including applying a DCT transform.

Many end users have legacy analog VCRs. They are able to record the analog transmissions on a magnetic medium and then review the recorded programs while performing various video manipulations such as fast forward (FF), fast reverse (REW), play (PLAY) and pause (PAUSE).

The quality of analog recorded programs is relatively low in comparison to the digitally transmitted programs. Furthermore, analog VCR cassettes are relatively large.

Due to these disadvantages various digital based solutions were developed. A first solution includes installing a Personal Video Recorder (PVR) device at the end user premises. The PVR allows the end user to store a program in MPEG format, thus defining a stored program. The stored program may be manipulated to provide FF and REW modes. This solution is costly as it requires dedicated hardware. Accordingly, operators want to implement a PVR-like solution at their plant.

Another solution is based upon service provider equipment. The solution may include near video on demand, true video on demand and the like. The various types of video on demand services (and systems) are collectively referred to as video on demand services (and systems). Video on demand systems are based upon a provision of programs to viewers over communication networks such as Hybrid Fiber Coax (HFC) networks. It is noted that networks other than HFC networks can be used.

Near video on demand systems allow a user to purchase or rent pre-stored programs such as movies and the like, using a broadcast technique known as staggered time. The same program is transmitted at predefined time intervals and a user can receive a program or skip between programs that are delayed by predefined delay periods.

True video on demand (TVOD) does not have the strict delay limitations of the near video on demand. A true video on demand service provides the end user with full-functional VCR capabilities, including forward and reverse play, freeze, and random positioning.

In order to allow an end user to control the display of the TVOD media stream the service provider allocates a single channel for that end-user at a certain time.

Many service providers provide various services including TVOD, home shopping, interactive games and the like.

The provision of the additional service is complex and costly as it requires to develop relatively complicated set top box software, service provider software and also to provide hardware that can support an exchange of many signals between the service provider and the end users.

Various method for providing video on demand and/or interactive services are illustrated in the following patents and patent applications, which are all incorporated herein by reference: U.S. Pat. No. 6,201,536 of Hendricks et al.; U.S. Pat. No. 6,668,377 of Dunn, U.S. Pat. No. 6,065,050 of DeMoney; U.S. Pat. No. 6,502,139 of Birk, et al.; U.S. Pat. No. 6,438,596 of Ueno et al.; U.S. Pat. No. 6,622,305 of Wilard; U.S. Pat. No. 6,701,528 of Arsenault, et al.; U.S. patent application publication No. 2004/0046780 of Beaton et al.; European patent applications EP 0804028 of Ebihara and EP 1028588A1 of Inoue et al., and PCT patent application WO99/291108 of Fransmae et al.

Modern service providers are forced to scale their infrastructure in order to provide services to a growing amount of end users. This infrastructure is also supposed to store more media content than in the past and to provide media content in various manners, including media streaming.

In order to provide TVOD service the service provider infrastructure (TVOD infrastructure) usually includes one or more VOD servers that execute a back office VOD software. This software can perform asset management functions, implement media content provision and reception rules. In addition, the software usually allows the VOD server to acquire pre-recorded media streams and to transmit the media streams to set top boxes, in response to media manipulation signals provided by the end user.

Modern service providers are facing a rapid increment in the number of end users, a dramatic increment in the amount of services that are provided to end users, a grooving complexity level of additional services. Accordingly there is a need to provide an efficient system and method for providing VOD and interactive services.

SUMMARY OF THE INVENTION

The invention provides a method for providing service to an end user, the method includes: converting images to multiple end user device readable pictures; receiving a request from an end user to display at least one image, wherein the request is conveyed over a TVOD infrastructure; and providing the end user with a stream of end user device readable pictures that includes at least one end user device readable picture that corresponds to the requested image.

A method for providing service to an end user, the method includes: converting images to multiple end user device readable pictures; associating video stream manipulation commands with interactive service commands; receiving a video stream manipulation command from an end user; and providing, in response to an interactive service command associated with the received video stream manipulation command, a stream of end user device readable pictures to the end user.

A method for generating a media stream, the method includes: determining a transition effect between two anchor pictures; and generating a sequence of transition pictures such that a decoding and a displaying process of a stream that includes a first anchor picture that is followed by the sequence of transition pictures that are preceded by the second anchor picture provides the transition effect.

Conveniently, the transition pictures are common for all images and may be encoded only once.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
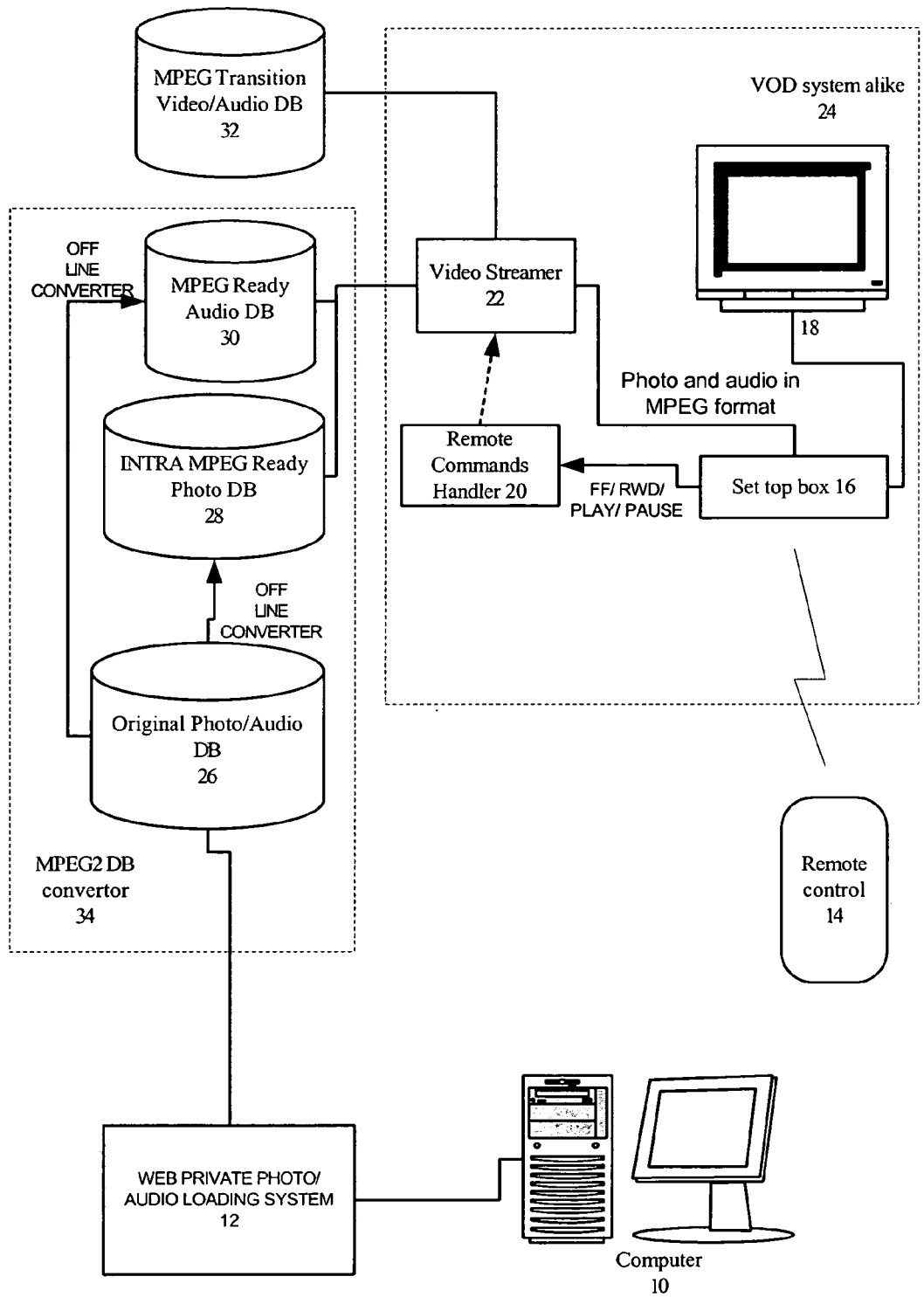
FIG. 1 illustrates end user equipment as well as service provider equipment, according to an embodiment of the invention.

The disclosed technique is directed to a broadband network, which can be either wired or wireless, such as an HFC network, a DSL network, satellite communication and the like.

It is further noted that the description relates to MPEG (and especially MPEG2) compliant programs and components, but the invention is applicable to other types of media unit decoding an/or compression schemes as well.

Conveniently, interactive services are provided by using media stream manipulation commands, especially those that are used in TVOD applications including FF, REW, PLAY and PAUSE. Conveniently, these signals may be used for navigation on any interactive service.

According to an embodiment of the invention the media stream manipulation commands can be used during navigation and during asset selection.

The terms "video server", "video streamer", and "interactive server" have the same meaning. They all describe a computerized entity that is capable of providing media content to multiple remote devices such as set top boxes.

The term "computerized entity" means hardware, or a combination of hardware and software, that has data processing capabilities. It can optionally have storage capabilities but this is not necessarily so.

The term "TVOD infrastructure" means the hardware, and/or software and/or middleware that are required to convey control signals and media signals such as to provide a TVOD service to an end user. Conveniently, this infrastructure includes a limited amount of control or uplink wires.

The term "anchor picture" means a picture that can be independently decoded. For example an I picture is an anchor picture.

One of the embodiment of the invention provides a system for providing an interactive service to an end user. The system includes an interface and a computerized entity. The interface is connected to an end user device via a TVOD infrastructure. The interface can be a remote command handler, or can be a part of a communication server, a video server, and the like. The interface is adapted to receive at least one request from an end user to display at least one image. The end user does not necessarily send a request to receive an image but rather sends a video manipulation command that is interpreted as a request to receive the image. The computerized entity is adapted to convert images to multiple end user device readable pictures and to provide a stream of end user device readable pictures that includes at least one end user device readable picture that corresponds to the requested image. Conveniently, the computerized entity can include (or be a part of) a video server, a converter, a video streamer and the like.

Conveniently, the system includes at least one storage unit, accessible by the computerized unit, adapted to store at least one end user device readable picture and multiple duplicating pictures. Conveniently, the at least one storage unit includes an audio database and a video database.

Conveniently, the computerized entity or at least one database of the system is adapted to store at least one end user device readable picture and multiple duplicating pictures.

Conveniently, the system is adapted to receive a request from the end user to receive another image and to provide, to the end user, a stream of end user device readable pictures that includes at least one end user device readable picture that corresponds to the other requested image.

Conveniently, the computerized entity or at least one database of the system is adapted to store at least one end user device readable picture and multiple transition pictures.

Conveniently, the system stores multiple sets of transition pictures, wherein each set of transition pictures is associated with a unique transition effect. The transition effect can be a visual effect, an audio effect or a combination of both.

According to an embodiment of the invention a system for providing a service to an end user is provided. The system includes an interface and a computerized entity. The computerized entity is adapted to convert images to multiple end user device readable pictures, and to associate video stream manipulation commands with interactive service commands. The interface is adapted to receive a video stream manipulation command from an end user. The system is adapted to provide, in response to an interactive service command associated with the received video stream manipulation command, a stream of end user device readable pictures to the end user.

Conveniently, the video manipulation command is pause, play, rewind or fast forward. Conveniently, the system is adapted to receive a video stream manipulation command that is associated with an image change operation and to provide to the end user a stream of end user device readable pictures such as to change an image that is displayed to the end user.

According to an embodiment of the invention a system for generating a media stream is provided. The system includes: (i) at least one storage unit adapted to store transition pictures and (ii) a computerized entity adapted to determine a transition effect between two I pictures The computerized entity is adapted to generate a sequence of transition pictures such that a decoding and a displaying process of a stream that includes a first anchor picture, a sequence of transition pictures and the second anchor picture, provides the transition effect. Conveniently, the transition pictures are dependent pictures.

Conveniently, the system further includes an interface adapted to receive a request to receive a stream that includes two anchor pictures out of a group of anchor pictures and to retrieve the two anchor pictures and the sequence of transition pictures.

Conveniently, the system is further adapted to determine another transition effect and to generate other transition pictures.

Conveniently, the system is further adapted to provide the stream during a provision of an interactive service.

Conveniently, the system is further adapted to associate video stream manipulation commands to picture retrieval commands.

For convenience of explanation it is assumed that the end user has a set top box that is capable of receiving and decoding audio and video streams. This assumption shall not limit the scope of the invention as an end user can be equipped with another type of device. Such a device is usually relatively cheap and has at least some of the following capabilities: network connectivity, multicast reception, unicast stream reception, video and audio decoding, generating streams in a format that is compatible with a display device, selection of which content (or channel) to view.

Optionally such a device has interactive services supporting capabilities. These capabilities can include reception of local controls, such as the remote control handling, nPVR controls, or networked controls, internet browsing, email, T-Commerce, nPVR, and more.

A video server can receive TVOD video stream manipulation commands and in response provide an interactive service. The provision of the interactive service is facilitated by:
(i) mapping video stream manipulation commands to interactive service commands, and (ii) providing interactive services that can be controlled by the interactive video commands. For example, assuming that the interactive service involves navigating in a catalog of a car vendor. The car vendor catalog will be divided into various images folders. The user will be able to navigate to a certain folder by providing a certain video manipulation command (for example PAUSE), navigate out of the folder (for example by providing a REW), navigate within a folder to view selected images (for example by providing PLAY), and so on.

FIG. 1 illustrates end user equipment as well as service provider equipment, according to an embodiment of the invention.

The end user equipment includes set top box 16, display (such as television) 18, remote control 14 and computer 10. The set top box 16 controls the display 16. The remote control 14 wirelessly transmits various commands including video manipulation commands (such as FF, RWD, PLAY and PAUSE) to the set top box 16. These commands are sent by set top box 16 to a remote commands handler 20 and then to video streamer 22. The video streamer 22 can provide a stream of end user device readable images and audio to the set top box 16.

Set top box 16, display 18, remote command handler 20 and video streamer 22 form a "VOD like system" 24.

The end user equipment also includes computer 10 that executes an image/audio downloading application 12. This application enables the end user to send images and audio to the service provider MPEG2 DB converter 34. The latter includes various databases and a image and audio converter. The conversion process is illustrated by lines from database 26 to databases 28 and 30 denoted "off line conversion".

It is noted that the audio or video content can be sent to the MPEG2 DB converter 34 by other entities than an end users. When a certain entity wishes to provide an interactive applications these images and audio are sent by that entity. Such an entity can be a vendor that uses interactive applications to publish its merchandize or service, and/or to perform interactive transactions.

The MPEG2 DB converter 34 includes an original photo/audio database 26, an MPEG ready audio database 30, an INTRA MPEG ready photo database 28 and a converter. The original photo/audio database 26 stores images and audio as provided by end users, interactive service providers and the like. The MPEG ready audio database 30 stores audio streams that are formatted in a end user device readable format, such as but not limited to MPEG format.

According to an embodiment of the invention the MPEG2 DB converter 34 includes a database that stores video streams in an end user device readable format. According to another embodiment of the invention the MPEG2 DB converter 34 stores I pictures, duplication pictures and transition pictures, and is able to provide the I pictures as well as either transition streams or duplication streams such as to form a video stream that can be provided to the end user.

By storing only the I pictures of each specific interactive service while storing transition pictures and duplicating pictures that can used for any media stream the system dramatically reduces the amount of stored information. This also reduces the amount of resources that are allocated to the processing of the video streams.

The INTRA MPEG ready photo database 28 stores only anchor pictures, and the MPEG ready audio database stores MPEG compliant audio streams. The transition pictures as well as transition audio streams are stored in the MPEG transition video/audio database 32. The duplicating pictures can be stored in any of these databases but can also be stored at the video streamer 22.

Conveniently, multiple sets of transition pictures, each associated with a different transition effect, are stored at MPEG transition video/audio database 32.

Databases 26, 28 and 30 can be accessed by video streamer 22.

Once the video streamer 22 determines to provide a certain interactive service it fetches the appropriate I-picture from the INTRA MPEG ready photo database 28, fetches the corresponding audio stream from the MPEG ready audio database 30 and fetches either transition pictures or duplication pictures from MPEG transition video/audio database 32.

The video streamer 22 merges the retrieved pictures and audio streams to provide an MPEG media stream to the set top box 16.

Conveniently, various transition types (or transition effects) are associated with a set of transition pictures as well as a transition audio picture. The MPEG transition video/audio database 32 stores multiple sets of transition pictures, each associated with a different transition visual effect.

The various transition effects may include horizontal wipe, vertical wipe, fade-away, dissolve, fade to black, fade from black, fade to white, fade from white, shrinking, size changes, and the like. These transitions can operate on one or more boarders of the image. These effects can be implemented by a series of transition pictures.

The following paragraphs illustrate various transitions. It is assumed that the transitions occur between a first image (I picture) Im1 and a second image (I picture) Im2. It is also noted that either one of these images can be a black image Ib, a white image Iw or any predefined image.

A single boarder up to down horizontal wipe from Im1 to Im2 can be implemented by a series of B pictures. The first B picture includes information that can instruct the decoder to generate an image that includes one or more (for example k) upper lines of Im2 and the (N-k) lower lines of Im2. Such a B picture includes zero prediction error as the pixels are copied either from Im2 of from Im1. The spatial difference is also zero, as the pixels from Im1 or Im2 are merely copied. A second B picture includes information that can instruct the decoder to generate an image that includes 2k upper lines of Im2 and the (N-2*k) lower lines of Im2. The series of B pictures can end when all the pixels are taken from Im2.

A double boarder horizontal wipe from Im1 to Im2 can also be implemented by a series of B pictures. A first B picture includes information that can instruct the decoder to generate an image that includes g upper lines of Im2, g lower lines of Im2 and (N-2*g) intermediate lines of Im2. A second B picture includes information that can instruct the decoder to generate an image that includes 2*g upper lines of Im2, 2*g lower lines of Im2 and (N-4*g) intermediate lines of Im2. The series of B pictures can end when all the pixels are taken from Im2.

A fade to (from) white can be applied by using B-pictures that refer to Im1 and Iw (or to Iw and Im1), a fade to (from) black can be applied by using B-pictures that refer to Im1 and Ib (or to Ib and Im1).

It is further noted that the method and system can also perform visual transitions that involve predefined images other that Im and Iw. For example such an image can include a color that differs from white or black.

A fade away effect can be achieved by generating a series of B pictures that refer to Im1 and to a certain fade away image (such as Iw or Ib) and introduce prediction error that gradually reduce the pixel values (when applying a fade away to white) or gradually increase the pixel values (when applying a fade away to black).

Shrinking Im1 while providing a certain background can be applied by providing B pictures that map multiple pixels of Im1 to fewer pixels and copying background pixels outside the reduced sized Im1.

The video streamer 22 can receive the relevant signals and sends the selected images as regular program video to set top box 16 (Send Intra Pictures). The video streamer 22 executes an interactive service software that determines how to translate each video stream manipulation command to picture and audio stream retrieval, merge and transmission operations. Such a software can emulate a state machine that jumps from one state to another in response to a reception of a video stream manipulation command.

Figure 2:
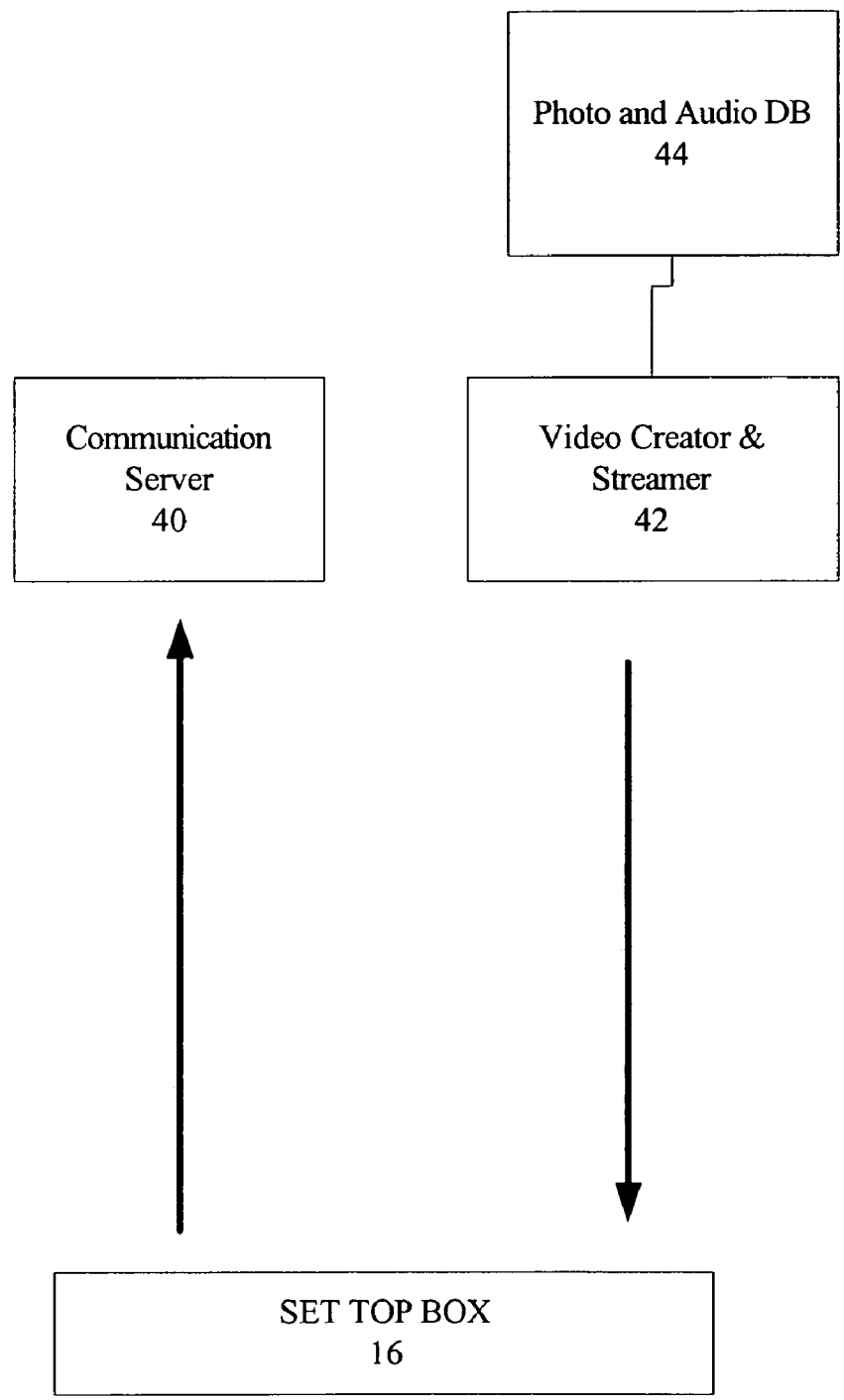
FIG. 2 illustrates a relationship between a video creator and streamer and a set top box, according to an embodiment of the invention.

FIG. 2 illustrates the relationship between a video creator and streamer and the set top box. Four commands (FF, RWD, PLAY, PAUSE) are conveyed over an uplink control channel to a communication server 40 that sends commands to a video creator and streamer 42 that can include video streamer 22 and various components of MPEG2 DB converter 34 of FIG. 1.

The video creator and streamer 42 receives photos and audio from a database 44 and converts the received audio and video to an MPEG compliant audio stream to be provided to the set top box 16 in response to the received commands that are generated by a user navigation device, such as a STB that is controlled by a remote control device.

It is noted that a video server can include various databases, converters, streamer and communication server, but this is not necessarily so.

Figure 3:
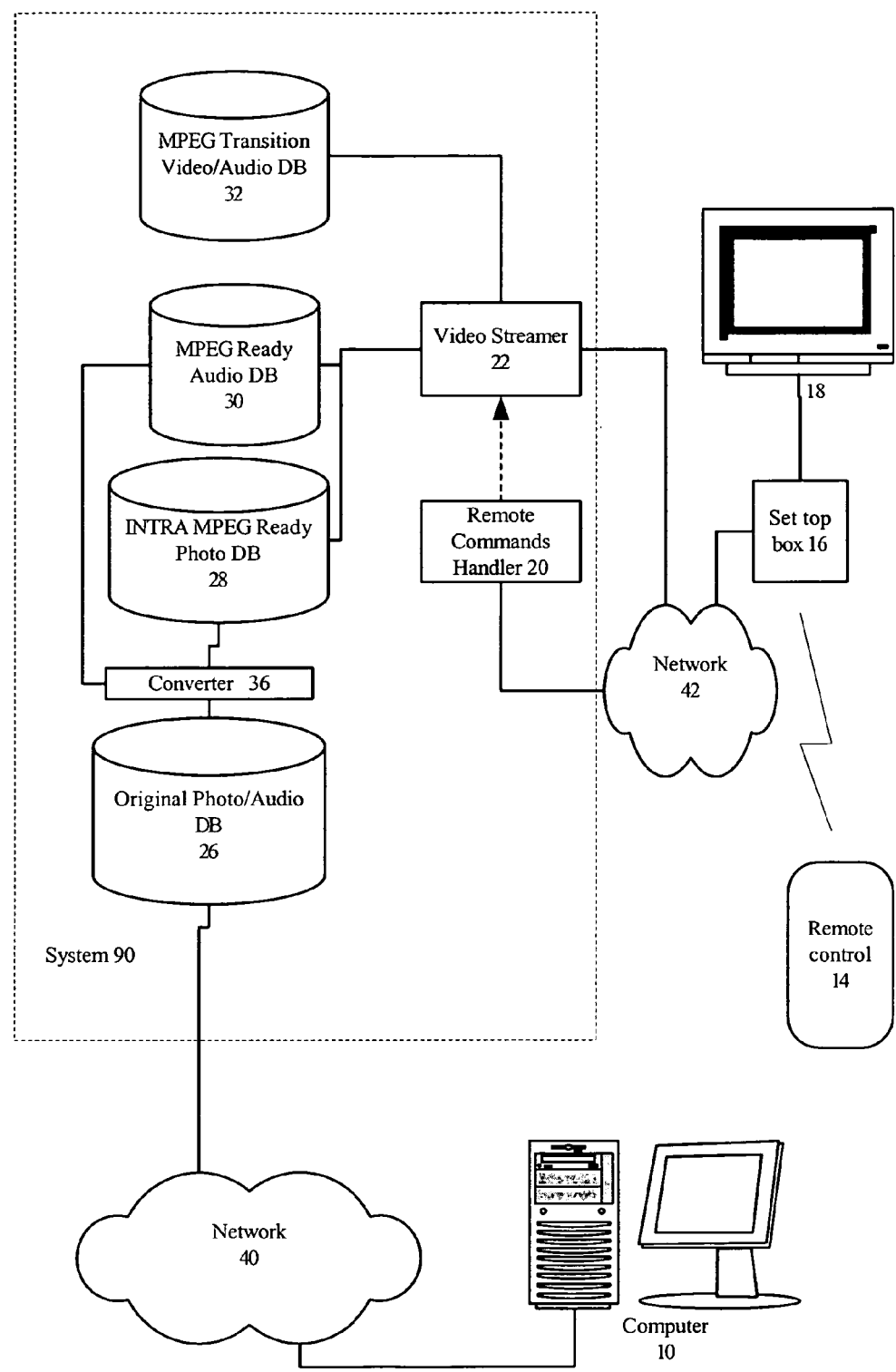
FIG. 3 provides a more detailed view of the service provider infrastructure and also illustrates an exemplary partition between end user equipment and service provider equipment, according to an embodiment of the invention.

FIG. 3 provides a more detailed view of the service provider infrastructure and also illustrates the partition between end user equipment and service provider equipment. The latter is referred to as system 90.

FIG. 3 includes a converter 36 (instead merely arrows of FIG. 1 that are denoted "off line conversion"). The converter 36 performs the video and/or audio conversion. FIG. 3 also illustrates two networks 40 and 42 that are connected between the end user equipment and the service provider equipment. It is also noted that a single network can replace the two networks. For example, the computer can be connected to the MPEG2 DB converter 34 over a cable infrastructure that is also used to convey media programs.

Figure 4:
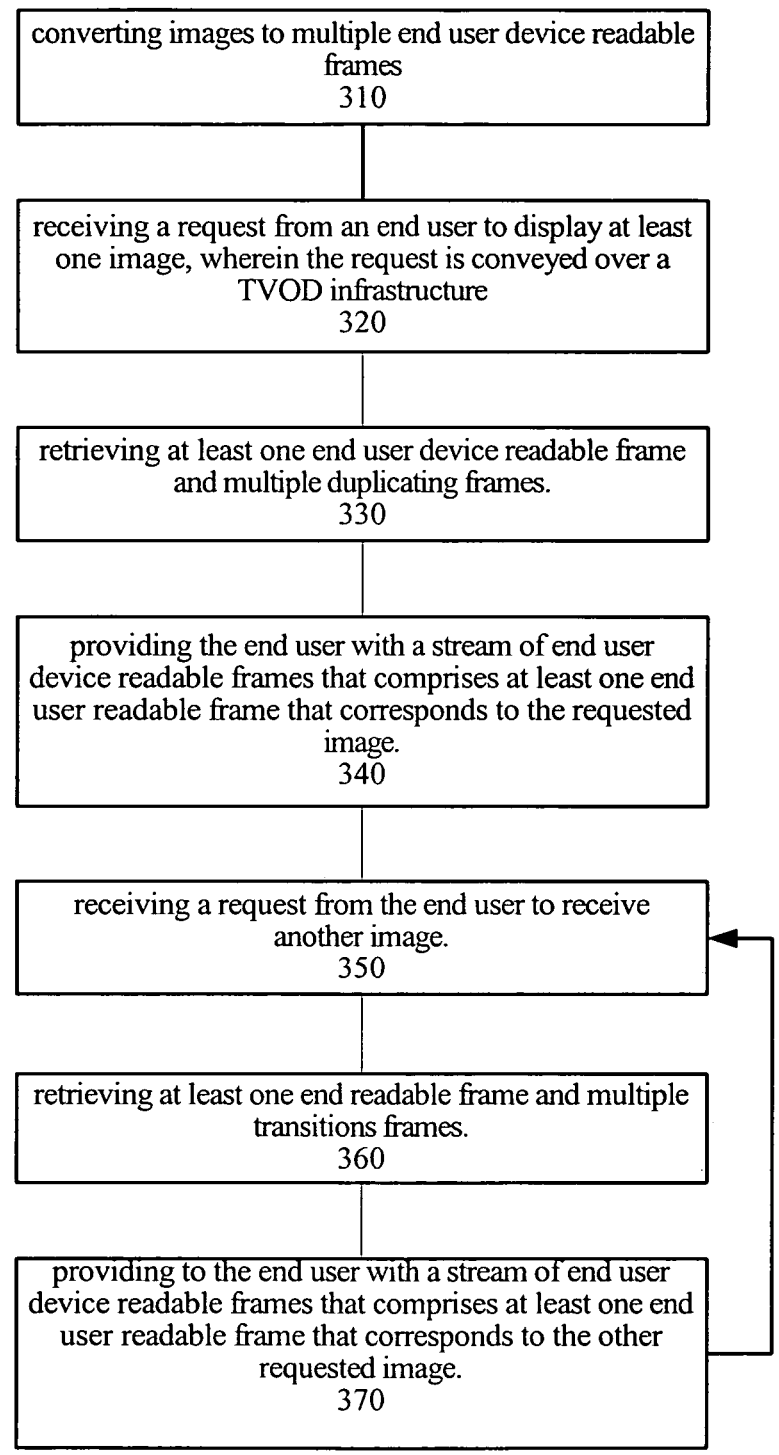
FIG. 4 illustrates a method for providing a service to an end user, according to an embodiment of the invention.

FIG. 4 illustrates method 300 for providing a service to an end user, according to an embodiment of the invention.

Method 300 starts by stage 310 of converting images to multiple end user device readable pictures.

Conveniently this stage can include: receiving images (such as BMP formatted images) by a video server. Referring to FIG. 1 an end user or a vendor can use a computer 10 or another computerized entity that can execute software that facilitates loading images and/or audio streams to an a storage unit such as original photo/audio database 26. Once the images and/or audio streams are stored in database 26 they can be converted to a format such as MPEG, that can be readable by the end user equipment and especially by set top box 16.

Stage 310 is followed by stage 320 of receiving a request from an end user to display at least one image, wherein the request is conveyed over a TVOD infrastructure.

Stage 320 is conveniently followed by optional stage 330 of retrieving at least one end user device readable picture and multiple duplicating pictures.

Stage 330 is followed by stage 340 of providing the end user with a stream of end user device readable pictures that includes at least one end user device readable picture that corresponds to the requested image.

Stage 340 is followed by stage 350 of receiving a request from the end user to receive another image over the TVOD infrastructure.

Stage 350 is followed by optional stage 360 of retrieving at least one end readable picture and multiple transitions pictures.

Stage 360 is followed by stage 370 of providing to the end user a stream of end user device readable pictures that includes at least one end user device readable picture that corresponds to the other requested image.

Conveniently, method 300 includes selecting multiple transition pictures out of multiple sets of transition pictures, wherein each set of transition pictures is associated with a unique transition effect. The selection can be made in advance, by the service provider, by the vendor that is associated with the interactive service or by the end user. The end user can select a transition effect and send the selection over various networks, including networks other than the HFC network. For example, the end user can have a computer that can access the service provider over various networks, including the Internet, and provide the service provider with images as well as information that indicates which transition effect he wants.

It is noted that if the end user requests to receive yet another image (or the original image) the method jumps to stage 350. It is noted that each iteration can be associated with a different visual transition effect.

It is further noted that the video stream can be accompanied by an audio stream.

Some transition effects, such as fade to black, fade to white, fade from white, fade from black and the like, perform a transition fro a certain image to a predefined image (such as a black image or a white image) in this case the provided stream will include a predefined image as well as another image that is provided by the end-user or by a third entity that differs from the end user. This third entity can be, for example, a vendor, a manufacturer, or merchant that uses the interactive service to advertise or sell its products.

Figure 5:
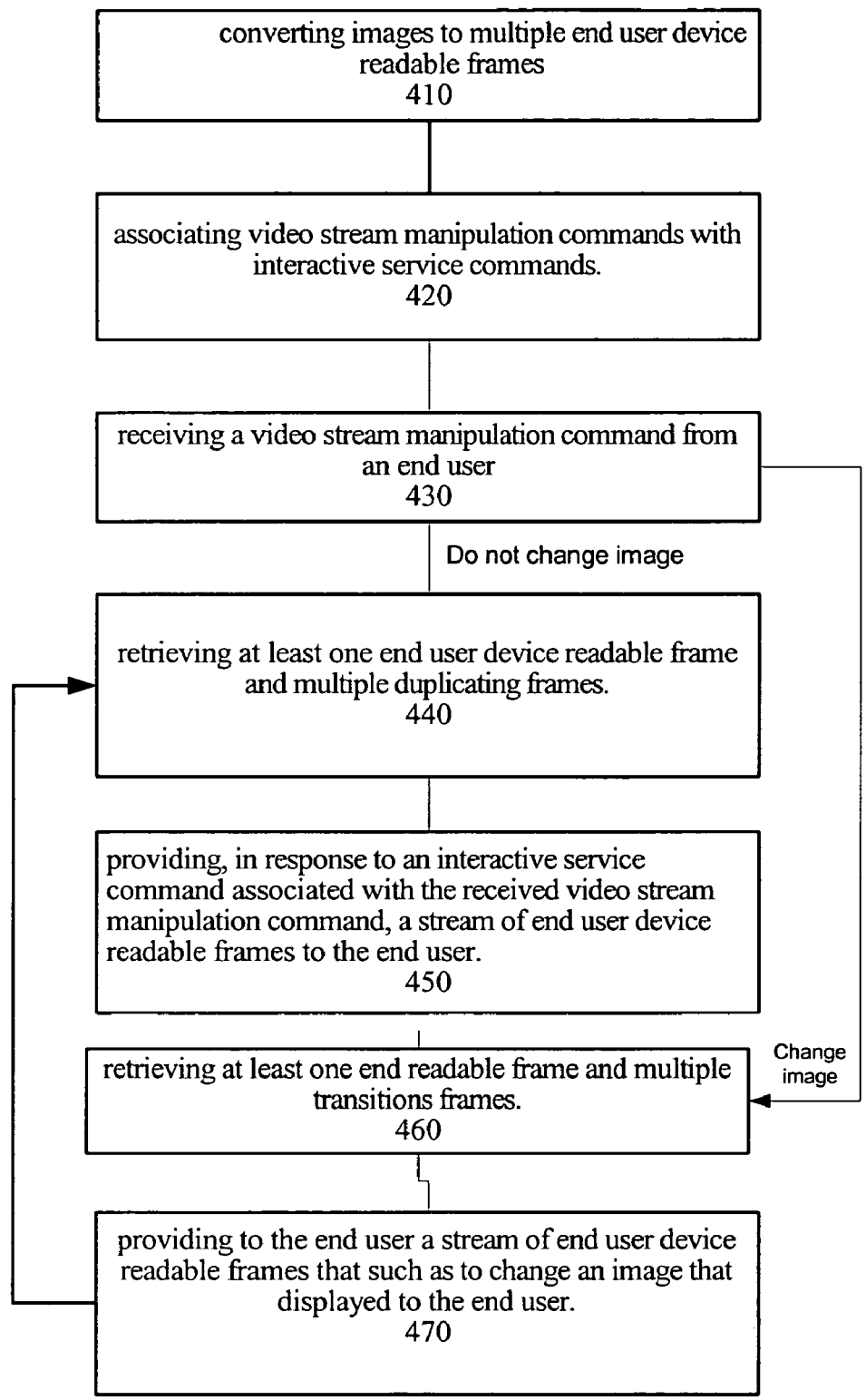
FIG. 5 illustrates a method for providing a service to an end user, according to another embodiment of the invention.

FIG. 5 illustrates method 400 for providing a service to an end user.

Method 400 starts by stage 410 of converting images to multiple end user device readable pictures.

Stage 410 is followed by stage 420 of associating video stream manipulation commands with interactive service commands.

Stage 420 is followed by stage 430 of receiving a video stream manipulation command from an end user. If the video stream manipulation command requires to replace a currently displayed image by another then stage 430 is followed by optional stage 460. Else, stage 430 is followed by optional stage 440. Stage 440 includes retrieving at least one end user device readable picture and multiple duplicating pictures.

Stage 440 is followed by stage 450 of providing, in response to an interactive service command associated with the received video stream manipulation command, a stream of end user device readable pictures to the end user.

Conveniently, the video manipulation command is pause, play, rewind or fast forward.

Conveniently, the interactive service commands include display an image, display another image, perform a transition effect, scroll up, scroll down, and the like.

Stage 460 includes retrieving at least one end user device readable picture and multiple transitions pictures.

Stage 460 is followed by stage 470 of providing to the end user a stream of end user device readable pictures such as to change an image that is displayed to the end user. Stage 470 can be followed by stage 450 such that after the transition to a certain image the method sends to the end user the certain image and duplicating pictures.

Conveniently, the method 400 includes selecting multiple transition pictures out of multiple sets of transition pictures, wherein each set of transition pictures is associated with a unique transition effect.

Figure 6:
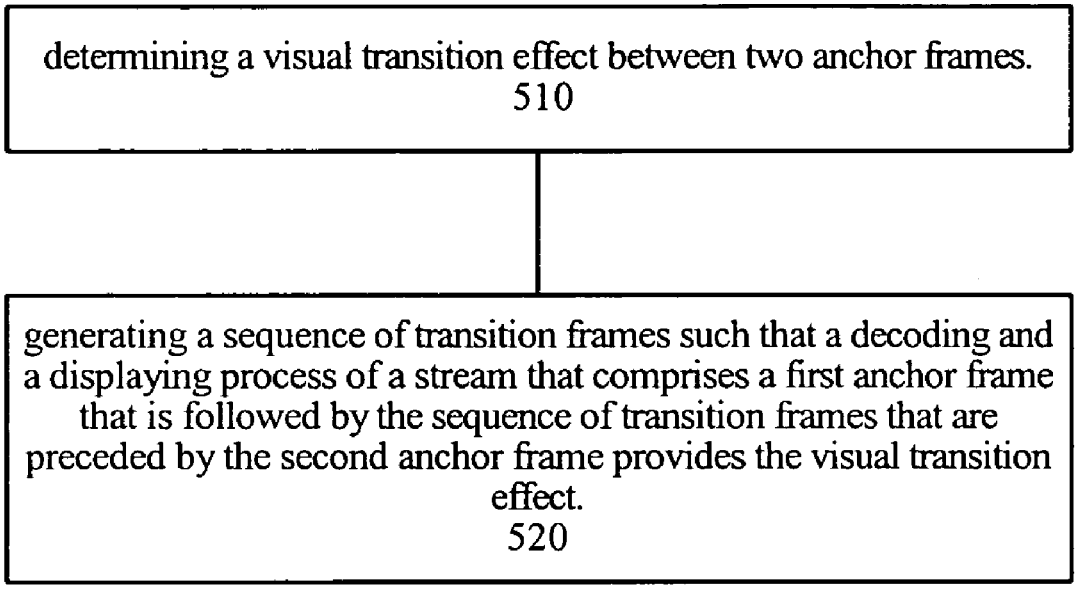
FIG. 6 illustrates a method for generating a media stream, according to an embodiment of the invention.

FIG. 6 illustrates a method for generating a media stream. According to an embodiment of the invention.

Method 500 starts by stage 510 of determining a transition effect between two anchor pictures.

Stage 510 is followed by stage 520 of generating a sequence of transition pictures such that a decoding and a displaying process of a stream that includes: (i) a first anchor picture, (ii) the sequence of transition and then (iii) the second anchor picture. This stream provides the transition effect from the first anchor picture to the other. Conveniently, the transition pictures are dependent pictures.

Conveniently, the transition pictures are encoded once and are inserted into the stream in real time.

Conveniently, method 500 further includes various stages such as: (i) a stage of receiving a request to receive a stream that includes two anchor pictures out of a group of anchor pictures, (ii) a stage of retrieving the two anchor pictures and retrieving the sequence of transition pictures, (iii) a stage of maintaining a current image by providing a stream of the image and duplicating pictures.

Conveniently, method 500 is applied such as to support multiple transition effects. Thus, method 500 can include a stage of determining another transition effect and generating other transition pictures.

Conveniently, stages (i) and (iii) are implemented during a provision of an interactive service.

According to an embodiment of the invention method 500 further includes associating video stream manipulation commands to picture retrieval commands.

According to another embodiment of the invention a media stream (such as a broadcast stream or a VOD stream) includes data that is sent to a software client on the end user equipment (such as but not limited to a set top box 16). This data can be sent on a dedicated PID, or embedded within regular PIDs in the stream.

The embedded data instructs the end user device which stream (signaled stream) out of a multiplex of multiple streams to request when a given event occurs. This event can be initiated by the user, by the incoming stream (for example: as an ad) or by an external event (such as when a certain time arrives). When the event occurs, the end user device requests the signaled stream from a video server (such as video streamer 22) using the same methods used for VOD streams.

After the request was fulfilled the end user device and the video server interact in a regular manner. At the end of the session, the STB or receiving device can go back to the original stream.

It will be apparent to those skilled in the art that the disclosed subject matter may be modified in numerous ways and may assume many embodiments other then the preferred form specifically set out and described above.

According to an embodiment of the invention the system and method require relative low bit rate because the transition pictures are relatively small. Accordingly, the bit rate of such a video stream is mainly determined by the size of the I pictures.

According to an embodiment of the invention the system and method can provide various combination of audio transition effects and video transmission effects. They do not necessarily occur simultaneously. For example, a video transition effect can be accompanied by background music.

According to other embodiments of the invention the media stream that includes I pictures and duplicating pictures and/or transition pictures can be multicast and even broadcast.

According to yet another embodiment of the invention a media stream can include I pictures that are provided by different entities. For example such a stream may include images provided by an end user or by a third entity.

According to yet a further embodiment of the invention anchor pictures can be manipulated in various manners, such as re-sizing, insertion into predefined background, insertion in a stream that includes advertisements and the like.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

We claim:

1. A method for providing a service to an end user, the method comprising:
    converting non end user device readable images to multiple end user device readable pictures;
    receiving a request from an end user to display at least one image, wherein the request is conveyed over a TVOD infrastructure;
    retrieving at least one end user device readable picture that corresponds to the requested image from a photo database that stores only anchor pictures; and
    providing the end user with a stream of end user device readable pictures that comprises the at least one end user device readable picture that corresponds to the requested image.

2. The method according to claim 1 wherein stage of retrieving further comprises retrieving multiple duplicating pictures.

3. The method according to claim 1 wherein the stage of providing is preceded by retrieving multiple transitions pictures from a transition database that is not the photo database.

4. The method according to claim 3 further comprises selecting multiple transition pictures out of multiple sets of transition pictures, wherein each set of transition pictures is associated with a unique transition effect.

5. The method according to claim 1 further comprising receiving at least one image from the end user and converting the image into an end user device readable picture.

6. The method according to claim 1, wherein the receiving of the request comprises receiving from the user a video stream manipulation command that is conveyed over a TVOD infrastructure and that is associated with a interactive service navigation command for navigating between non end user device readable images in an image folder out of multiple image folders.

7. The method according to claim 1, wherein the providing is preceded by manipulating the at least one end user device readable picture by insertion of the at least one end user device readable picture in the stream that includes advertisements.

8. A method for providing service to an end user, the method comprising:
    converting non end user device readable images to multiple end user device readable pictures;
    associating video stream manipulation commands with interactive service commands, wherein the interactive service commands comprise navigation commands for navigating between non end user device readable images; wherein the interactive service enables the end user to navigate to an image folder out of multiple image folders, and to navigate within the folder to view selected images;
    receiving a video stream manipulation command from an end user; and
    providing, in response to an interactive service command associated with the received video stream manipulation command, a stream of end user device readable pictures to the end user.

9. The method according to claim 8 wherein the video manipulation command is pause, play, rewind or fast forward.

10. The method according to claim 8 wherein stage of providing is preceded by retrieving at least one end user device readable picture and multiple duplicating pictures.

11. The method according to claim 8 wherein the stage of providing is preceded by retrieving at least one end user device readable picture and retrieving multiple transitions pictures from a transition database that is not a photo database in which the end user device readable pictures are stored.

12. The method according to claim 11 further comprises selecting multiple transition pictures out of multiple sets of transition pictures, wherein each set of transition pictures is associated with a unique transition effect.

13. A method for generating a media stream, the method comprising:
    receiving a request to receive a stream that comprises two anchor pictures out of a group of anchor pictures;
    determining a transition effect between the two anchor pictures, wherein the transition effect is selected from a group of: wipe, fade-away, dissolve, fade to black, fade from black, fade to white, fade from white, shrinking and size changes; and
    generating a sequence of transition pictures such that a decoding and a displaying process of a stream that comprises a first anchor picture out of the two anchor pictures, the sequence of transition pictures and then the second anchor picture out of the two anchor pictures provides the transition effect.

14. The method according to claim 13 wherein the transition pictures are dependent pictures.

15. The method according to claim 13 further comprising retrieving the two anchor pictures from a photo database that stores only anchor pictures, and retrieving the sequence of transition pictures from a transition database that is not the photo database.

16. The method according to claim 13 further comprising determining another transition effect and generating other transition pictures.

17. The method according to claim 13 further comprising providing the stream during a provision of an interactive service that enables the end user to navigate to an image folder out of multiple image folders, and to navigate within the folder to view selected images.

18. The method according to claim 13, wherein the determining of the transition effect comprises selecting multiple transition pictures out of multiple sets of transition pictures, wherein each set of transition pictures is associated with a unique transition effect, wherein the selecting is determined by a selection of the end-user.

19. The method according to claim 13, wherein the determining of the transition effect comprises selecting multiple transition pictures out of multiple sets of transition pictures, wherein each set of transition pictures is associated with a unique transition effect, wherein the selecting is received over a network that is different than the network over which the stream of the displaying process is transmitted to the end-user.

20. The method according to claim 13, wherein the determining of the transition effect comprises selecting multiple transition pictures out of multiple sets of transition pictures, wherein each set of transition pictures is associated with a unique transition effect, wherein the selecting is determined by a selection of a vendor that is associated with the interactive service;

wherein the receiving of the request is preceded by receiving images from the vendor and converting the images into the two anchor pictures;
   wherein the interactive service enables the end user to navigate to an image folder out of multiple image folders of a catalogue of the vendor, and to navigate within the folder to view selected images.

21. A system for providing service to an end user, the system comprises:

an interface for receiving at least one request from an end user to display at least one image, wherein the request is conveyed over TVOD infrastructure;
   at least one storage unit, accessible by the computerized unit, that stores a photo database that stores at least one end user device readable picture, wherein the photo database stores only anchor pictures; and
   a computerized entity adapted to convert non end user device readable images to multiple end user device readable pictures and to provide a stream of end user device readable pictures that comprise at least one end user device readable picture that is retrieved from the photo database and that corresponds to the requested image.

22. The system according to claim 21 wherein the at least one storage unit further stores multiple duplicating pictures.

23. The system according to claim 21 wherein the computerized entity is further adapted to store at least one end user device readable picture and multiple duplicating pictures.

24. The system according to claim 21 further adapted to receive a request from the end user to receive another image and to provide, to the end user, a stream of end user device readable pictures that comprises at least one end user device readable picture that corresponds to the other requested image.

25. The system according to claim 21 wherein the a transition database is also stored at least one storage unit, wherein the transition database is not the photo database and that stores multiple sets of transition pictures, wherein each set of transition pictures is associated with a unique transition effect.

26. The system according to claim 21 adapted to receive at least one image from the end user and to convert the image into an end user device readable picture.

27. The system according to claim 21 further adapted to receive at least one image from a third entity and converting the image into an end user device readable picture.

28. A system for providing service to an end user, the system comprising:

a computerized entity adapted to convert non end user device readable images to multiple end user device readable pictures, and to associate video stream manipulation commands with interactive service commands, wherein the interactive service commands comprises navigation commands for navigating between non end user device readable images; wherein the interactive service enables the end user to navigate to an image folder out of multiple image folders, and to navigate within the folder to view selected images; and
   an interface adapted to receive a video stream manipulation command from an end user; whereas the system is adapted to provide, in response to an interactive service command associated with the received video stream manipulation command, a stream of end user device readable pictures to the end user.

29. The system according to claim 28 wherein the video manipulation command is pause, play, rewind or fast forward.

30. The system according to claim 28 further comprising at least one storage unit that stores at least one end user device readable picture and multiple duplicating pictures.

31. The system according to claim 28 further adapted to receive a Video stream manipulation command that is associated with an image change operation and to provide to the end user a stream of end user device readable pictures such as to change an image that is displayed to the end user.

32. The system according to claim 31 wherein the system is adapted to retrieve at least one end user device readable picture from a photo database that stores only anchor pictures; and to retrieve multiple transitions pictures from a transition database that is not a photo database in which the end user device readable pictures are stored.

33. The system according to claim 32 adapted to select multiple transition pictures out of, multiple sets of transition pictures, wherein each set of transition pictures is associated with unique transition effect.

34. A system for generating a media stream, the system comprising:

an interface for receiving at least one request from an end user to receive a stream that comprises two anchor pictures out of a group of anchor pictures, wherein the request is conveyed over TVOD infrastructure;
   at least one storage unit adapted to store transition pictures; and
   a computerized entity adapted to determine a transition effect between the two anchor pictures and to generate a sequence of transition pictures such that a decoding and a displaying process of a stream that comprises a first anchor picture out of the two anchor pictures, a sequence of transition pictures and then the second anchor picture out of the two anchor pictures provides the transition effect, wherein the transition effect is selected from a group of: wipe, fade-away, dissolve, fade to black, fade from black, fade to white, fade from white, shrinking and size changes.

35. The system according to claim 34 wherein the transition pictures are dependent pictures.

36. The system according to claim 34 further comprising an interface adapted to retrieve the two anchor pictures from a photo database that stores only anchor pictures, and to retrieve the sequence of transition pictures from a transition database that is not the photo database.

37. The system according to claim 34 further adapted to determine another transition effect and generating other transition pictures.

38. The system according to claim 34 further adapted to provide the stream during a provision of an interactive service that enables the end user to navigate to an image folder out of multiple image folders, and to navigate within the folder to view selected images.

39. The system according to claim 34 further adapted to associate video stream manipulation commands to picture retrieval commands.

40. A method for controlling an end user device, the method comprising:

providing data representative of stream selection operation associated with an occurrence of an event;

providing a selected stream in response to a request to receive the selected stream; wherein the request is generated by the end user device in response to an occurrence of the event.

41. The method according to claim 40 wherein the event is triggered by the end user.

42. The method according to claim 40 wherein the stage of providing a selected stream is followed by providing a stream that was provided prior the provision of the selected stream.

43. The method according to claim 40 wherein the data is conveyed on a dedicated PID.

44. A system, comprising:
an interface for receiving at least one request from an end user to receive a selected stream; wherein the request is generated in response to an occurrence of an event; and
a computerized entity, adapted to provide data representative of stream selection operation associated with an occurrence of an event, and adapted to providing the selected stream.

45. The system according to claim 44 further adapted to provide a stream that was provided prior the provision of the selected stream, after the provision of the selected stream ends.

46. The system according to claim 44 wherein the data is conveyed on a dedicated PID.

* * * * *